United States Patent [19]

Albright et al.

[11] 3,977,434

[45] Aug. 31, 1976

[54] APPARATUS FOR COOKING FOOD IN HOT NON-AQUEOUS LIQUIDS UNDER PRESSURE

[76] Inventors: Charles Jere Albright, 919 N. Michigan Ave., Chicago, Ill. 60610; Clifford E. Fitch, Sr.; Clifford E. Fitch, Jr., both of P.O. Box 221, South Holland, Ill. 60473

[22] Filed: Jan. 16, 1975

[21] Appl. No.: 541,593

Related U.S. Application Data

[62] Division of Ser. No. 367,811, June 7, 1973, Pat. No. 3,861,286, which is a division of Ser. No. 881,230, Dec. 1, 1969, Pat. No. 3,793,940.

[52] U.S. Cl. ......................................... 137/625.47
[51] Int. Cl.² .................. F16K 11/083; A47J 37/12
[58] Field of Search.................. 137/625.18, 625.19, 137/625.46, 625.47

[56] References Cited
UNITED STATES PATENTS
3,364,947  1/1968  Van Bragt...................... 137/625.47

*Primary Examiner*—Henry T. Klinksiek
*Attorney, Agent, or Firm*—Shoemaker and Mattare, Ltd.

[57] ABSTRACT

The essential concept of this invention basically involves the improved structuring and operative arrangement of a multiple-receptacle apparatus for the pressurized cooking of food in hot, non-aqueous liquid, wherein the food is inserted into and removed from a receptacle cooking compartment when it is essentially drained of the hot liquid and free of pressure.

12 Claims, 38 Drawing Figures

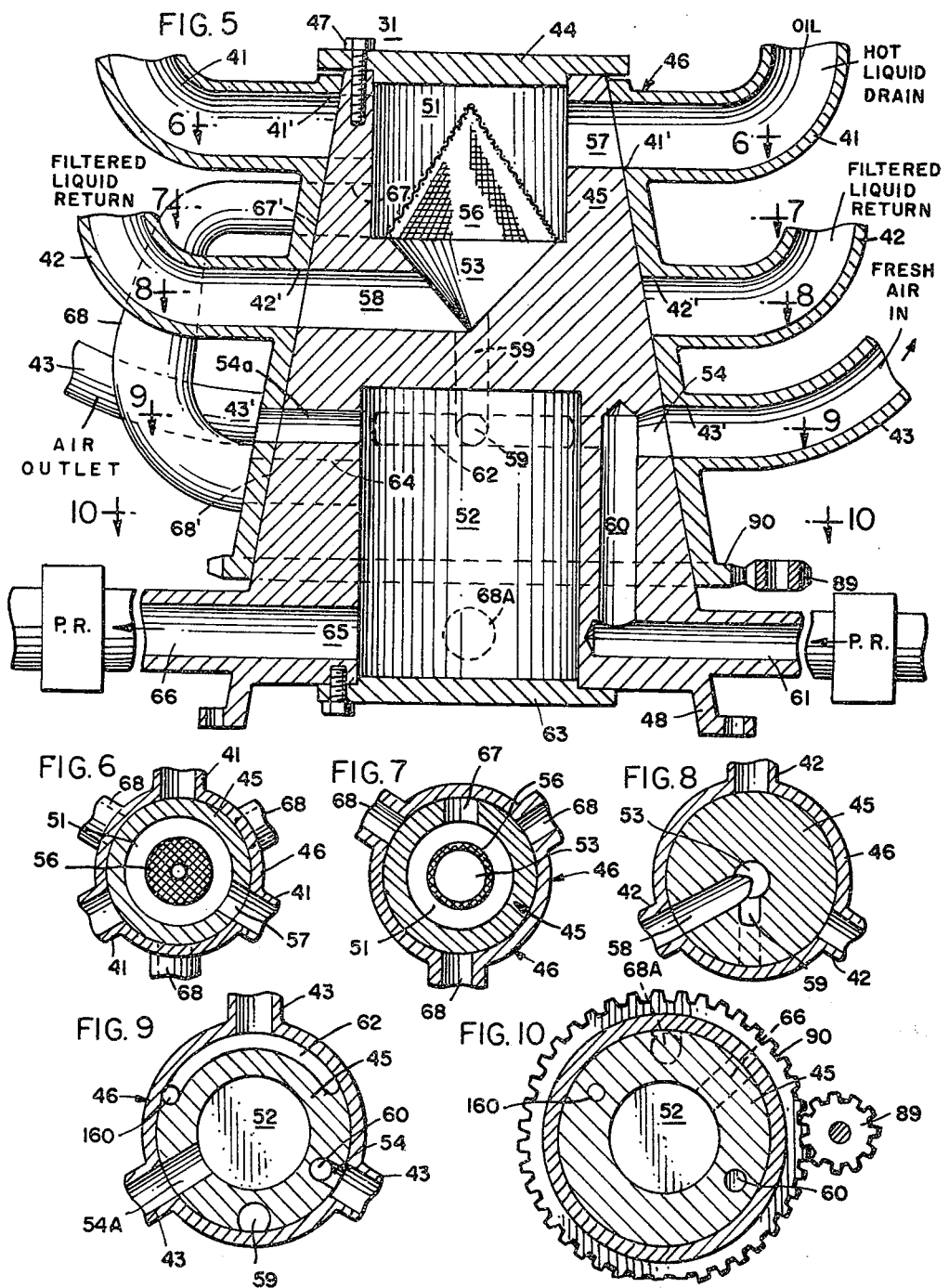

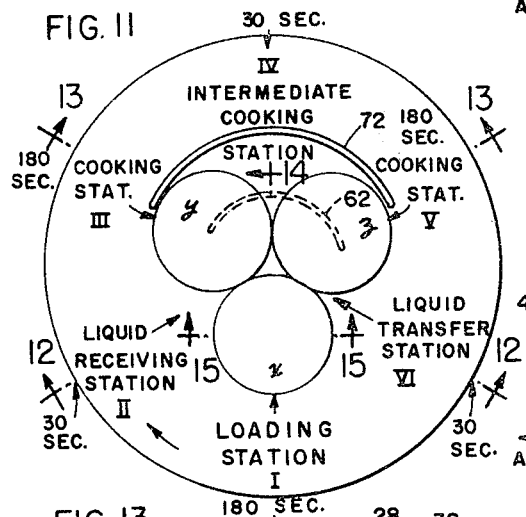
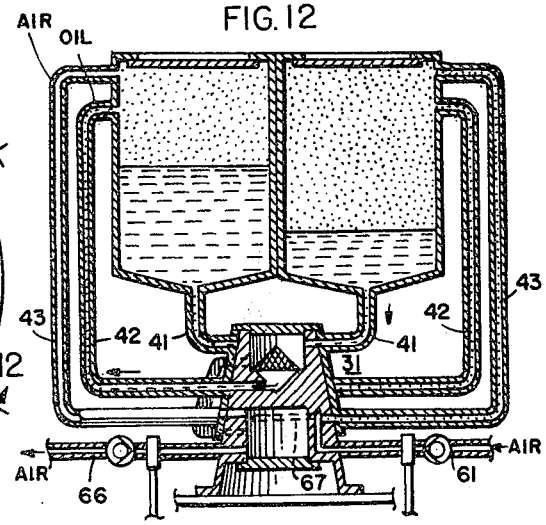
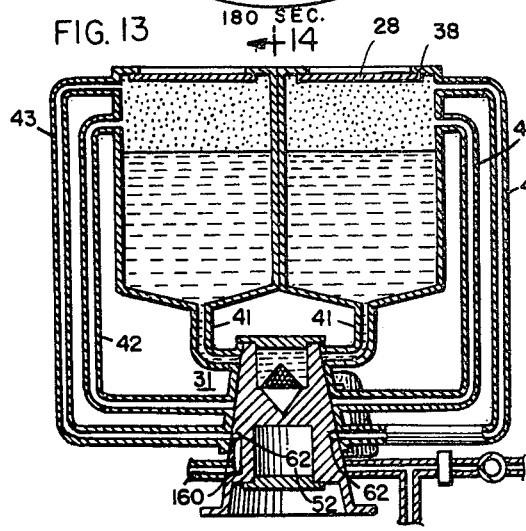
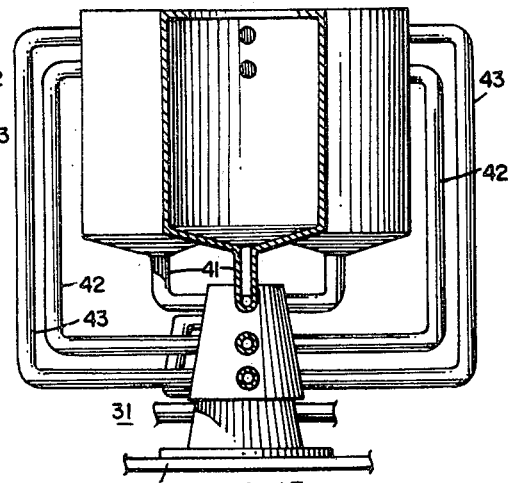
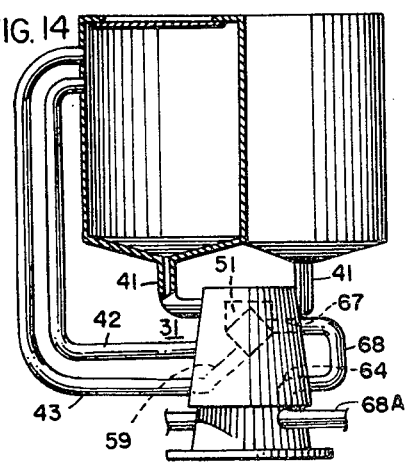

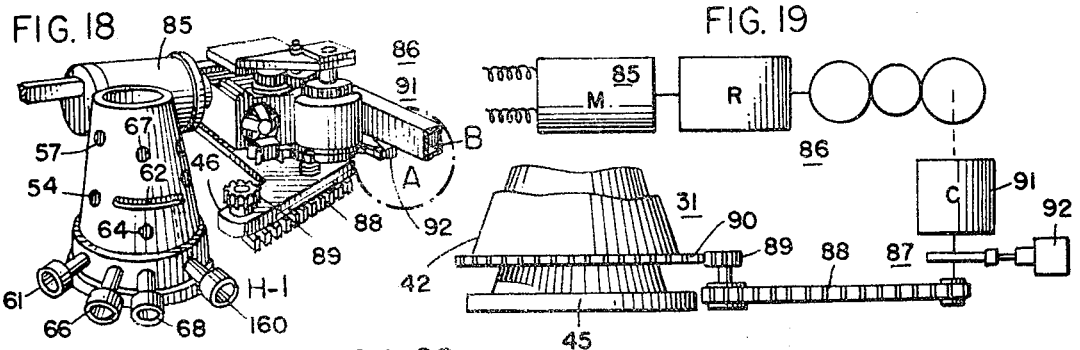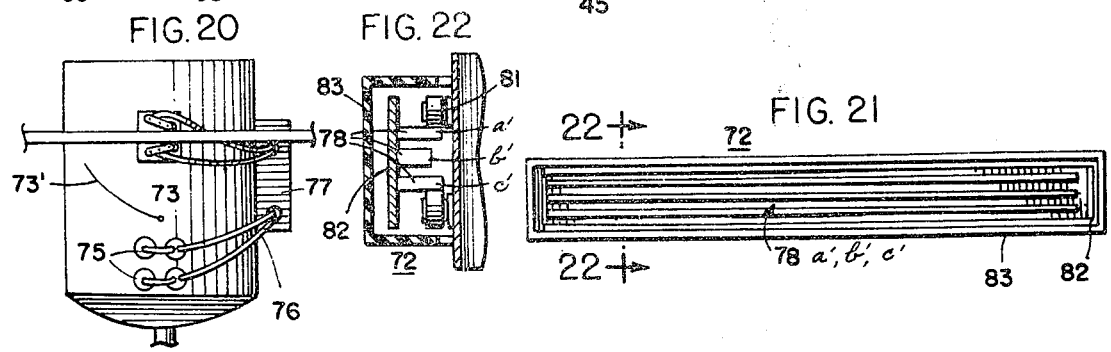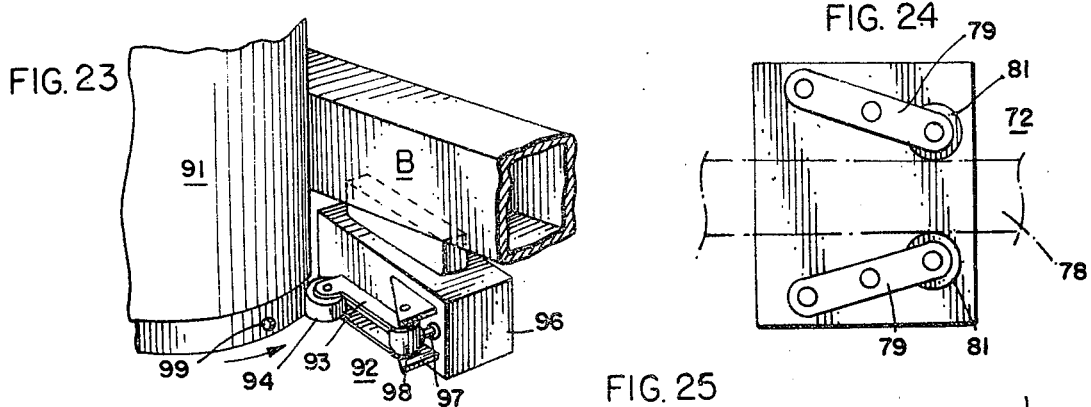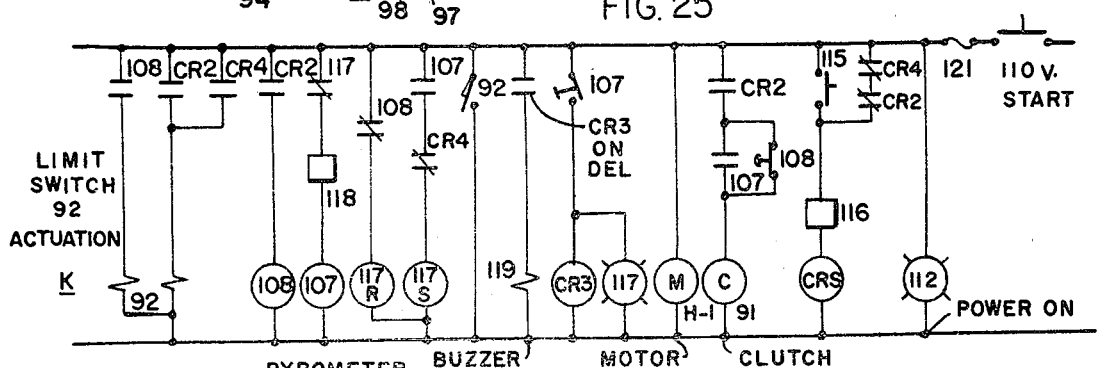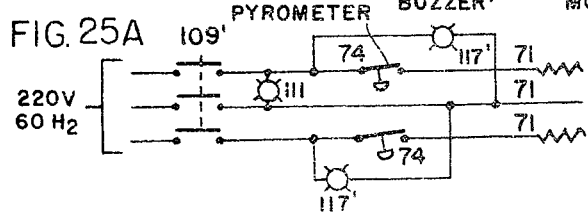

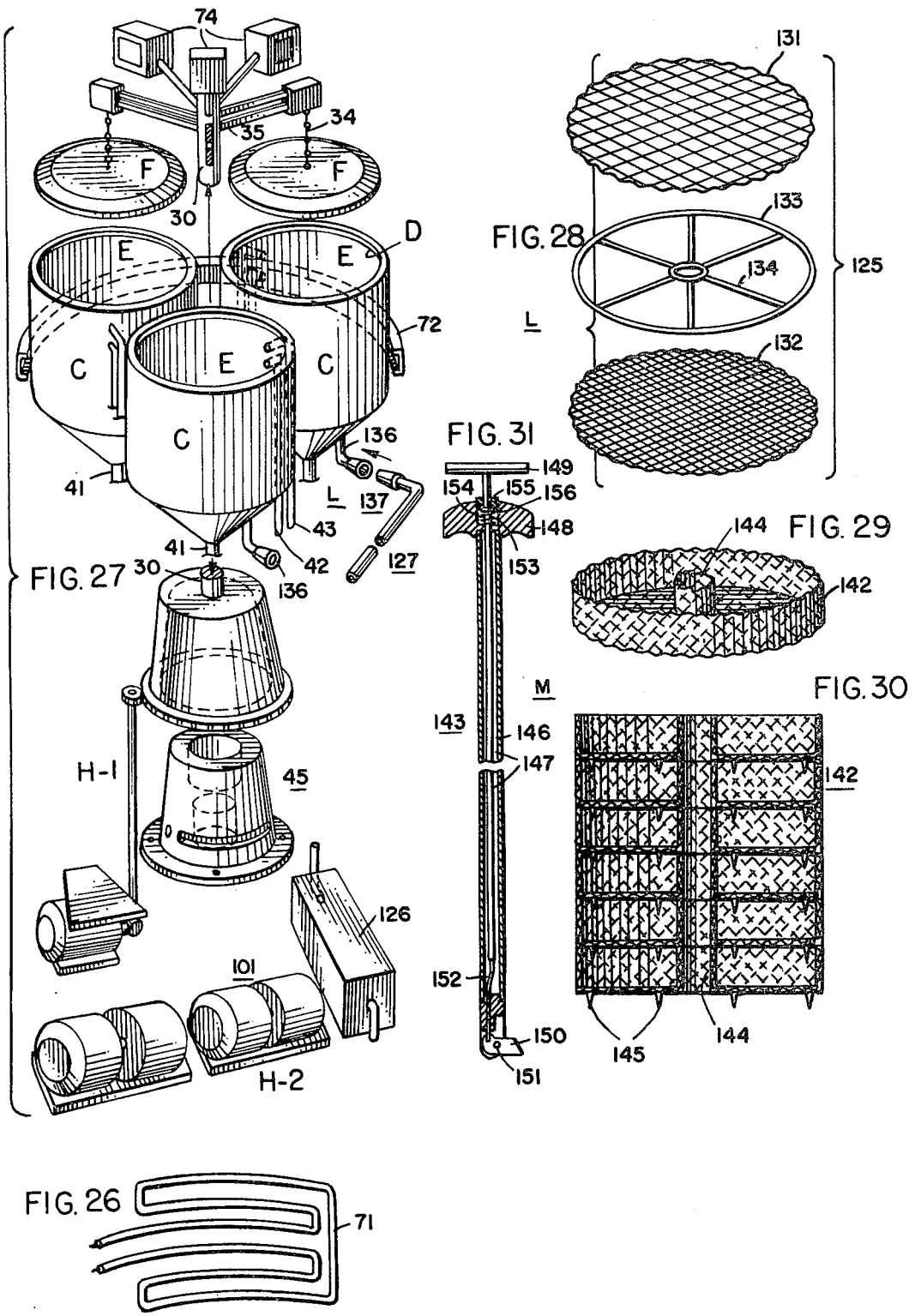

APPARATUS FOR COOKING FOOD IN HOT NON-AQUEOUS LIQUIDS UNDER PRESSURE

This application is a division of Ser. No. 367,811, filed June 7, 1973, now U.S Pat. No. 3,861,286, which in turn is a division of Ser. No. 881.230, filed Dec. 1, 1969 and now U.S. Pat. No. 3,793,940.

This invention relates to a new and effective structuring of equipment for use in the cooking of food in hot, non-aqueous liquids under pressure.

It is well known fact that the frying and/or baking of food—especially meat—requires a considerable period of time. During that time the natural juices, inherent in the food, are subjected to the high temperatures required for cooking the food. This converts the food-juices into a stream which escapes into the ambient atmosphere. Such extraction of the juices lessens the taste appeal and the nutrient quality of the food.

A greatly-lessened time-period for cooking food, especially meat, in pressurized, hot, non-aqueous liquids has been the subject matter of a number of patents in recent years. Examples of such apparatus are shown in the U.S. Pat. Nos. 2,532,639; 2,778,736; 2,827,379; 2,917,200; 2,918,861; 2,938,648; 2,964,215; 3,194,662; 3,232,267; 3,259,521; 3,314,416; 3,364,845; and 3,410,199. Some of these have been in commercial use.

Such types of apparatus are used with the cooking chamber operating at pressures ranging from 14 to 35 psi, for cooking periods ranging from 6 to 12 minutes. The general optimum for these conditions are 35 psi at temperatures approximately 380 degrees. The time periods have to be determined by the size and nature of the food product being processed, and the desired resulting cooked condition of the foods.

In such-above-noted, patented apparatus, at the close of each cooking cycle, the cooking chamber has to have the pressure reduced to nearly normal ambient atmospheric conditions. This is imperative before opening the chamber for the removal of the food. Any attempt to obtain access to the chamber, before such reduction to pressure, very possibly could result in serious harm to the operator and/or the spraying of particles of hot liquid over adjacent area. Hence, a minute or more has to elapse before the cooked food can be removed from the hot liquid. As a consequence a considerable portion of the natural juices in the food are converted into steam, during this brief period, rising into the space above the hot liquid. Obviously, this adds, somewhat, to the pressure in the receptacle and tends to further delay the removal of the closure-lid, and the withdrawal of the food from the hot liquid. Thus, in these prior disclosures there, inevitably, occurs the condition which has been noted above with regard to the process of frying or baking foods; namely, the loss of a portion of the natural food-juices.

Another disadvantage of such apparatus, as shown and described in these patents, is that under continuous use over periods of time, the draining and filtering of the liquid has to be effected when the apparatus is not required for cooking. As a result particles released from the earlier cooked food tend to accumulate in the liquid during such extended cooking periods. These accumulations tend to lessen the cooking efficacy of the liquid over an extended period of time. Moreover, the overcooked particles from previously-processed food tend to cling to the later-cooked food. The result is a reduced appeal of the later cooked food.

It should also be noted that the structures of the aforementioned patents were developed to meet a then-current demand for mass-production of food products cooked in pressurized hot liquid. Currently, that demand has increased so greatly that these antecedent, single-receptacle apparatus are insufficinet to meet this increased demand.

The main objects of this invention are; to provide a radically new structuring of a multiple-unit apparatus for the cooking of food in hot, non-aqueous liquids under pressure; to provide improved means for effecting the practically instant draining of the hot liquid and pressure from a receptacle at the end of a predetermined cooking period to permit the momentary withdrawal of the cooked food and the insertion of uncooked food, with the subsequent return of the hot liquid and pressure to the loaded receptacle; to provide for the introduction of hot liquid and pressure into a receptacle and subsequently effecting a practically instant withdrawal thereof; to provide improved means of this kind for transferring the hot-liquid and pressure from one receptacle to another; to provide an improved arrangement of a plurality of individual cooking receptacles in juxtaposed arrangement operable to effect the pretimed cooking of food successively in the respective receptacles; to provide improved means for the filtering of the hot liquid; to provide improved means for the filtering of the hot-liquid incident to each transfer thereof from one receptacle to another; to provide means for the automatic flushing of the filter following each passage of hot liquid therethrough; to provide a multiple, food-cooking apparatus of this kind wherein two or more receptacles may be arranged on a common support; to provide an improved means for maintaining a desired temperature of the liquid and pressure of air in each food-loaded receptacle throughout a continuous and uninterrupted operation of the apparatus; to provide an improved arrangement of manually-activatable, instruments for automatically effecting the predetermined cooking period in each receptacle; to provide an improved concentric arrangement of three receptacles with a pair of relatively-shiftable, coordinated valve elements the functioning of which is predetermined by the manual setting of certain of the instruments; to provide an apparatus of this kind wherein three receptacles are concentrically fixed about a central axis of rotation; and to provide an improved food-cooking apparatus of this kind of such simple structure as to make highly economical the manufacturing and marketing thereof and exceedingly gratifying and profitable the use thereof by purchasers.

The attainment of these objects can be effected by any type of structural arrangement comparable to what is illustrated and explained herein. Such an arrangement involves a plurality of receptacles the sequential functioning of which is controlled by a valve-complex and an associated-timer-controlled mechanism. The adaptation herein shown involves a valve-complex of frustum form. Whatever its form the valve-complex is activated to effect successive food-cooking periods in the respective receptacles with the recurring transfer of the hot liquid and/or pressure from one receptacle to another at the termination of each cooking period. The arrangements herein show multiple receptacles disposed in different vertical and horizontal relationships.

In the adaptations shown in the accompanying drawings;

FIG. 5 is a much-enlarged, vertical, diagrammatic, cross-sectional view of the frustum-type valve-unit as viewed from the plane of the line 5—5 of FIG. 3;

Figure 16:
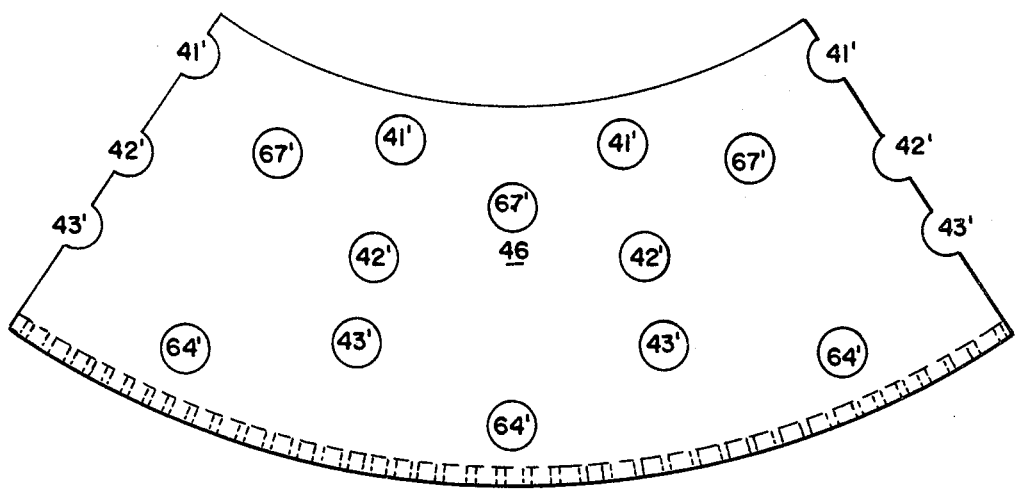
Figure 17:
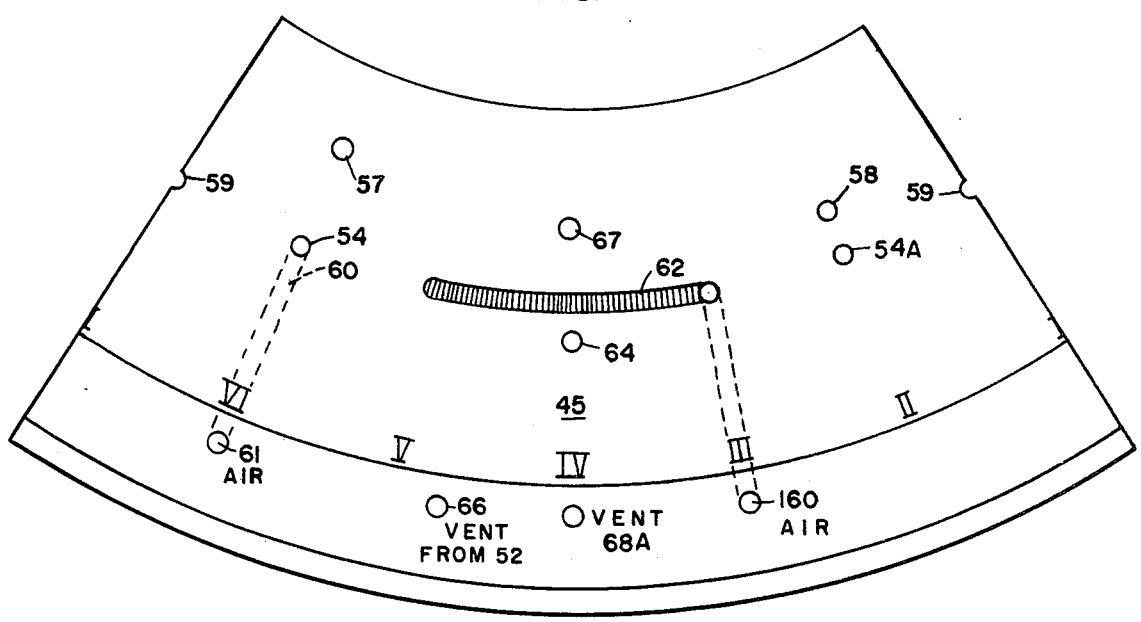
Figure 32:
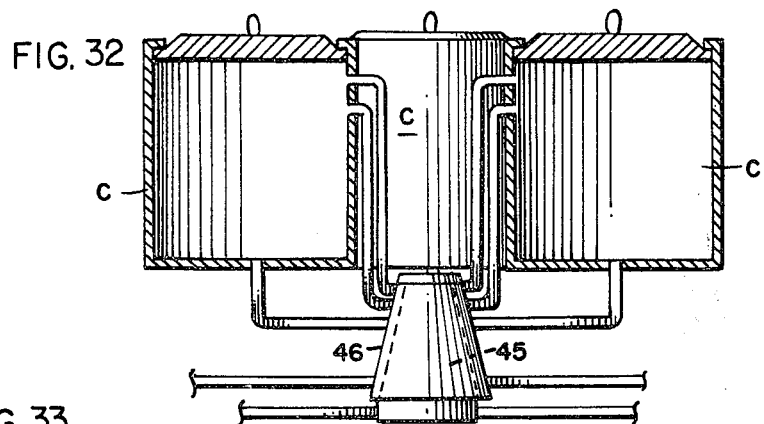
Figure 33:
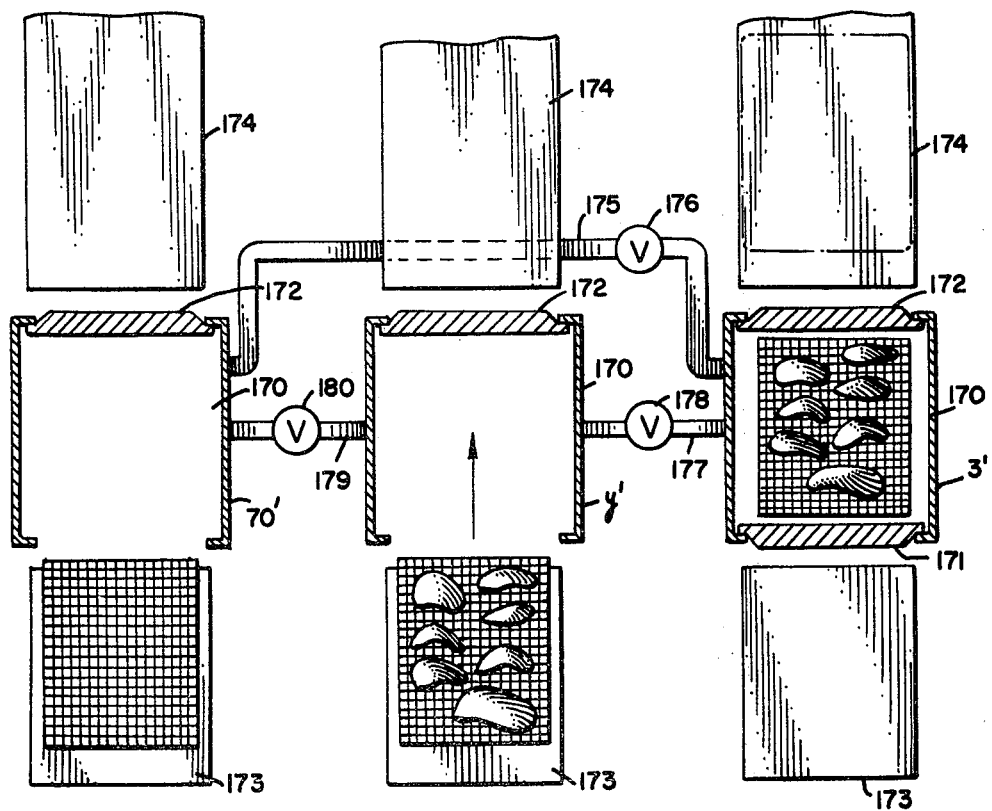
Figure 34:
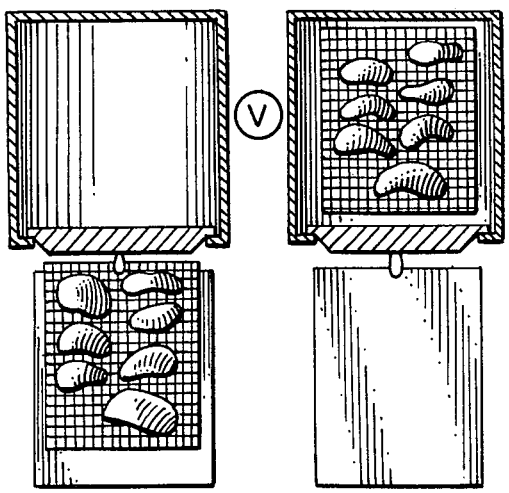
Figure 35:
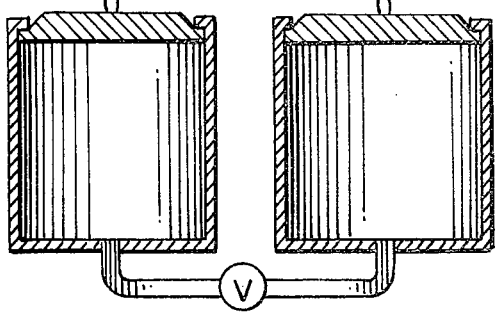

FIGS. 6 through 10 are reduced-size, cross-sectional views taken on the plane of the respective lines 6—6 through 10—10 of FIG. 5, designed to show the ports that are open for fluid flow in the respective planes;

FIG. 11 is a diagrammatic chart showing the six stations through which the receptacles successively move, with halts at each station, during the successive cooking of batches of food in each of the three receptacles;

FIG. 12 is a miniature and somewhat diagrammatic, vertical cross-sectional view of a pair of the receptacles at the stations II and VI of FIG. 11, as viewed from the plane of the line 12—12 of that Figure when the hot liquid is being transferred from any one to another of these receptacles;

FIG. 13 is another minature and somewhat diagrammatic, vertical, cross-sectional view of a pair of the receptacles at the stations III and V respectively, during a food-cooking period; as viewed from the plane of the line 13—13 of FIG. 11;

FIG. 14 is another miniature and somewhat diagrammatic vertical, cross-sectional view of one of the receptacles taken on the plane of the line 14—14 of FIG. 11 showing the empty condition just before the closure-lid is withdrawn;

FIG. 15 is a similar miniature-size and somewhat diagrammatic; vertical view of the three receptacles—with the forward one in cross-section when at the food-loading and unloading station, the view being on the plane of the line 15—15 of FIG. 10;

FIG. 16 is a peripheral layout of the inner face of the outer member of the valve-complex;

FIG. 17 is a peripheral layout of the outer face of the inner member of the valve-complex;

FIG. 18 is a miniature diagrammatic perspective of the motor-clutch-drive (juxtaposed to the inner part of the valve-complex) which effects the controlled, recurring rotative movements and halts of the receptacle relative to the six stations shown in FIG. 11;

FIG. 19 is a diagrammatic, side elevation of the various units of the motor-clutch drive shown in FIG. 18;

FIG. 20 is a much-reduced exterior view of the receptacles indicating the electrical connections for heating the cooking liquid therein;

FIG. 21 is an inside face view of the housing-mounted, three-track, two-trolley heat-control feature for effecting the successive cooking periods in the receptacles;

FIG. 22 is an enlarged, cross-sectional view, taken on the plane of the line 22—22 of FIG. 21, showing the opposed trolleys of FIG. 21;

FIG. 23 is an enlarged, partly borken-away, view of the device, shown in the circle A of FIG. 18, which controls the recurring 60° rotation of the receptacles during the normal continuous use of the apparatus;

FIG. 24 is an enlarged side view of a pair of trolleys shown in FIGS. 20 and 22;

FIG. 25 and 25a constitute a schematic layout of the circuitry and the various instruments involved in the operation of the preferred adaptation of such an apparatus, incident to the successive cooking of food in the respective receptacles;

FIG. 26 is a perspective view of one of a pair of electric heating elements used in each receptacle;

FIG. 27 is another exploded, diagrammatic, perspective of the primary features of this apparatus;

FIG. 28 is an exploded, perspective of the parts of an auxiliary filter used in the receptacles;

FIG. 29 is a perspective view of one of the containers used for the cooking of food in this apparatus;

FIG. 30 is a vertical, cross-sectional view of a stack of these food-containers as they are generally used with this apparatus;

FIG. 31 is a view of the handling tool for inserting into a stack of these containers—loaded with food—and later removed therefrom;

FIG. 32 is a diagrammatic view of a modification wherein the receptacles are stationary and the inner, frustum-shaped valve-unit (FIG. 5) is rotative relative to the receptacles;

FIG. 33 is a diagrammatic plan view of another modified structure wherein three receptacles are arranged in horizontal disposition;

FIG. 34 is a diagrammatic; cross-sectional, view of a pair of valve-connected receptacles horizontally-disposed for effecting substantially the same results as are accomplished in these other developments;

FIG. 35 is a view showing two such receptacles in vertical disposition and

Figure 36:
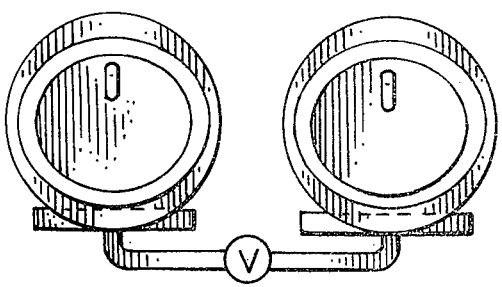

FIG. 36 is a view of the front or top, respectively, of what is shown in FIGS. 34 and 35.

Any of the multiple-receptacle apparatus, hereinshown and described, generally will comprise a cabinet A supported on an enclosed framework B mounting a plurality of food-cooking receptacles C and having food-loading and unloading openings D, to the respective cooking chambers E, each sealed by a closure-lid F and wherein the heating of the liquid is controlled by heat-pressure system G, in a sequence as effected by motor mechanisms H-1 and H-2 under the control of a group of operational-control instruments I mounted on a panel J and incorporated in a circuitry K plus certain auxiliary units L, for use with special food-cooking accessories M, all of which will be set forth in detail in what follows.

A multiple-receptacle apparatus embodying the foregoing concept, comprises juxtaposed, open-end cooking receptacles arranged to permit the receptacle (i) to be successively loaded with predetermined batches of raw food, (ii) having the closure-lids positioned over the open ends of the loaded receptacle, (iii) successively subjecting the loaded receptacles to pre-timed cooking periods, (iv) successively effecting the filtered transfer of the hot liquid and pressure from one receptacle to another, (v) retracting the respective closure-lid and (vi) removing the batch of cooked food and inserting fresh batch of raw food, whereupon the apparatus is subject to (vii) a continued succession of these functions.

Several types of such three-unit and two-unit apparatus are shown herein for use with either vertical- or horizontally-disposed receptacles. However, such an apparatus could incorporate four or more receptacles.

A presently-preferred structure, for such an apparatus, is shown in FIGS. 1 through 32. This adaptation involves a battery of three open-top receptacles C, hereinafter occasionally referred to as $x$, $y$, and $z$, each with its own closure-lid F. Such receptacles C are concentrically arranged in vertical disposition, with respect to a central standard 30 on a valve-complex 31 secured to a base plate 32 of the framework B. The functioning of such a group of receptacles C is determined by the coordinated action of the other features noted in these above paragraphs.

Figure 4:
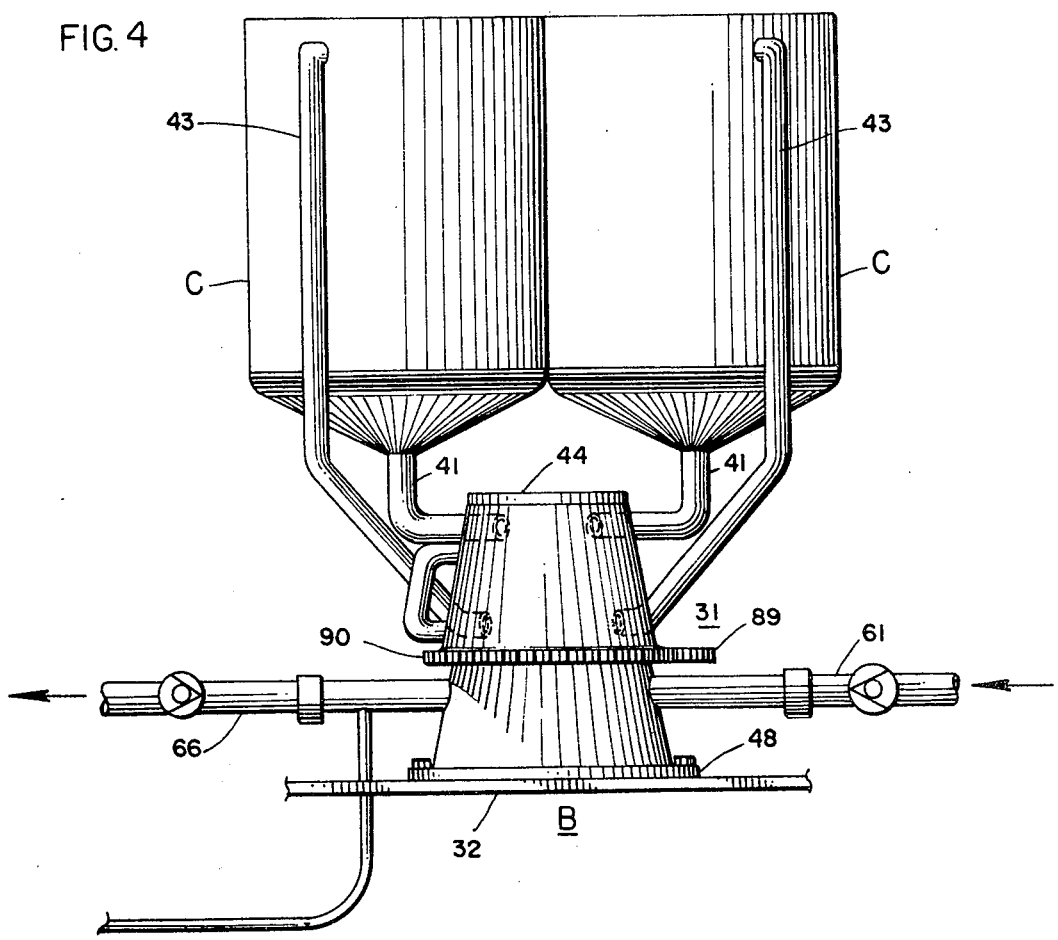
FIG. 4 is a somewhat reduced front elevational view of two of the receptacles taken on the plane of the line 4—4 of FIG. 3.

The closure-lip F, as shown for use in this multiple-unit apparatus, is one of the several possible forms shown in Applicants' co-pending application Ser. No. 701,728, filed Jan. 16, 1969. In that application the herein used closure-lid is shown in FIGS. 4 and 5. However, the closure-lid F could be one of those shown in FIGS. 6 through 13 of the aforesaid co-pending application, or, perchance of another different form. In fact certain of these might be preferred for some of the multiple-unit structures hereinshown, or later developed.

A closure-lid 33 for each of the receptacles $x$, $y$ and $z$, of the above-noted type, is shown suspended by a flexible tie 34 from an arm 35 hinged to a bracket 36 mounted on the standard 30. Springs 37 (FIG. 1) are fixed at their inner ends to the bracket 36 and looped around the respective arms 35. These serve to position each closure-lid 33 against a flange 38 (FIGS. 1 and 3) of a receptacle C, pending the operative retention of the closure-lid by the later-produced cooking pressure therein. These springs 37 also bias the respective closure-lid 33 upwardly above the receptacle C when the lid is to be removed from within a particular receptacle C (FIG. 1), as will be explained later.

Figure 1:
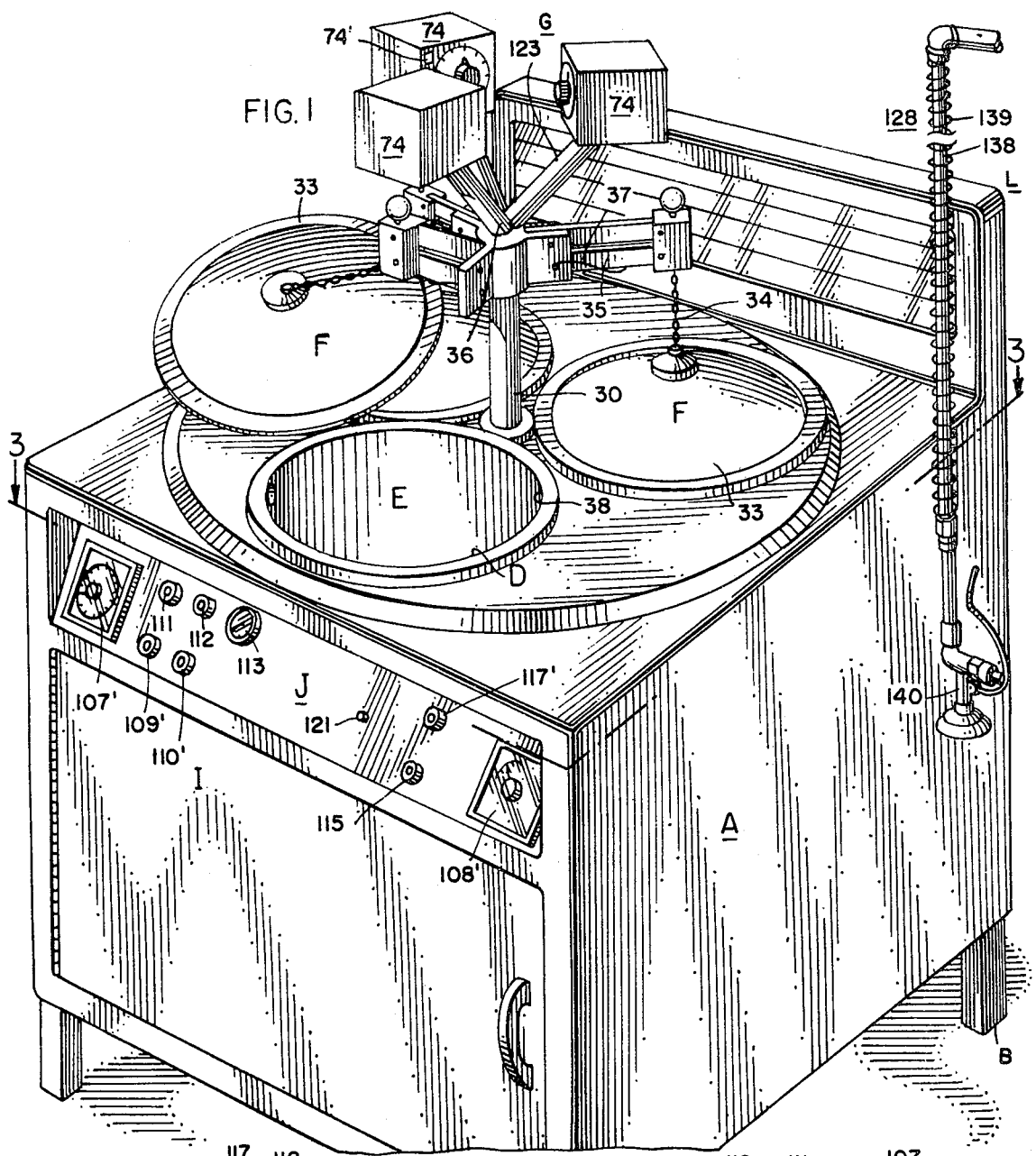
FIG. 1 is a front perspective view of a cabinet-enclosed, three-receptacle cooking apparatus embodying the hereinbefore stated concept, with the most forward closure-lid shown retracted to permit fool-loading and unloading thereof.

The heat-pressure system G involves the valve-complex 31, heat-producing units 71, a track-trolley feature 72 and thermal couples 73 connected to pyrometers 74 mounted above a group of receptacles C, as shown in FIG. 1.

The valve-complex 31, for the adaptation shown in most of the FIGS. 1 through 27, is a most significant feature of this apparatus. As FIG. 3 indicates, such a valve-complex is connected to the respective receptacles C by a series of conduits in the form of tubes 41, 42 and 43 (See alos FIGS. 12, 13, 14 and 15). These tubes provide for the hot liquid and air-pressure drain and supply, respectively, to and between these three receptacles $x$, $y$ and $z$. The functioning of this valve-complex will be explained in detail in the subsequent "operation" section of this specification.

Such a frustrum-valve-complex 31, as shown in FIGS. 5 through 10, is constituted of three main parts 44, 45 and 46. However, it should be understood that this FIG. 5 is somewhat diagrammatic in that above-noted tubes 41, 42 and 43, and the hereinafter-noted ports and channels are shown as diagrammatically opposed. In the actual structure there are three groups of these tubes, and opposed ports and channels, as is readily apparent from FIGS. 5 through 10 and FIGS. 16 and 17.

The top part 44 serves as a seal for the upper open ends of the parts 45. Such part 44 is secured in place, on the upper end of the part 45 by a number of bolts 47.

Figure 3:
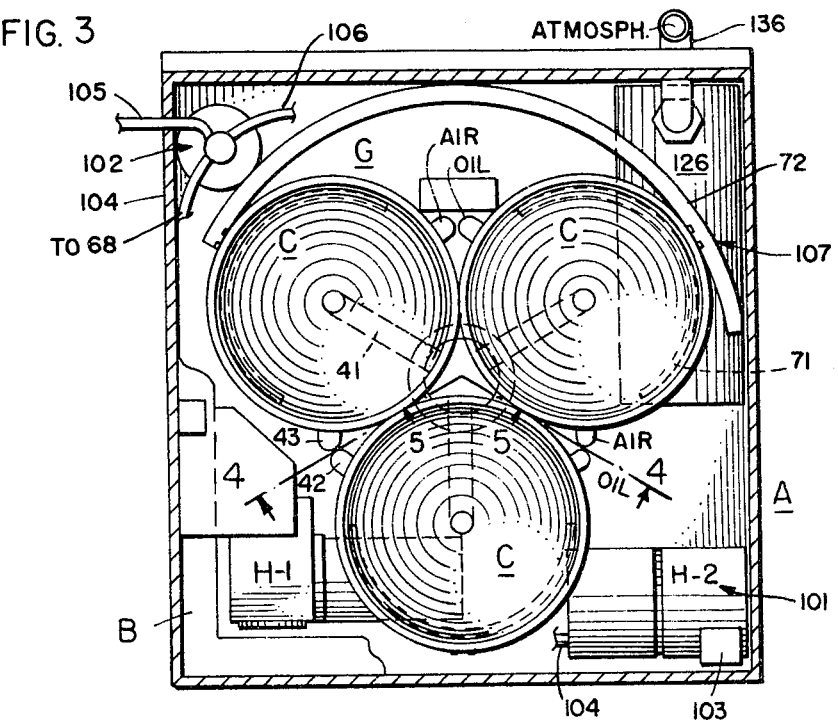
FIG. 3 is a reduced-size, plan of the receptacle arrangement as viewed approximately from the plane of the line 3—3 of FIG. 1.

The fixed inner frustum part or valving member 45 has the flanged base-rim 48 bolted to the base plate 32 of the framework B (FIG. 3). Interiorly, this part 45 has two axially-spaced compartments 51 and 52. Leading to and from these respective compartments 51 and 52 are special axially- and radially-spaced channels as presently noted. (See above-note FIGS. 5–10)

The upper compartment or filter chamber 51, closed by the plate 44, preferably is of cylindrical form with an inverted, downwardly-disposed conical extension 53. A filter element 56, here shown as of conical form, is embraced within the compartment 51 above the extension 53. Subject to direct recurring communication with this compartment 51 and its conical extension 53 are the series of tubes 41, 42 and 43, through a first, liquid drain port and a second, liquid supply port, 57 and 58, respectively, connected at the upper end of filter chamber 51 and lower end of conical extension 53, respectively, in circumferentially spaced relation to one another, and a single axial channel backwash port 59, also connected with the lower end of extension 53, spaced circumferentially from port 58, as these receptacles C move successively through the series of stations I, II, III, IV, V and VI, as will be explained in detail in the later "operation" section of this specification. Intermediate these groups of channels and spaced therebelow, is a circumferential slot or channel 62 and a third, air supply port 54 communicating with a fresh-air duct or air supply port 61 through the axial extension 60. The slot 62 is of a length of about one-third the exterior circumference of the valve part and receives air-pressure from a fourth, air supply port or channel 160 separate from fresh-air duct 60. (See FIGS. 5, 9, 17 and 18.

It is important that note be taken here of the position and dimension of the slot 62 in the part 46 of the valve-complex 31. It is through this slot that fresh-air is supplied to any pair of the receptacles C when they are at the intermediate "food-cooking" stations III, IV and V, (FIGS. 11 and 12).

The lower compartment or vent chamber 52, closed by a plate 63 (FIG. 5), has communication with two axially-spaced, radial channels or a fifth, air vent port and a sixth, air exhaust port, 64 and 65, respectively, the latter of which leads to a deteriorated air duct or outlet port and exhaust conduit 66 wherein a pressure regulator is installed. The channel 64 is in registration with the tube 43 when a cooking receptacle is at station II for the purpose of venting air pressure during the transfer of hot liquid from a receptacle at station VI. The venting of pressure is done through the tube 43 from the receptacle through channel 64, into the compartment 52 and out the deteriorated duct 66 incorporating a pressure regulator which is set to maintain a pressure somewhat lower than is set for the pressure cooking via slot 62 or special pressure duct 60 (FIGS. 5, 9 and 10). Such pressure regulator prevents the complete loss of pressure from the air-pressure receiver 102 during the transfer periods while the venting of the pressure via duct 66 prevents a static pressure between cooking receptacles at stations VI and II during transfer which might otherwise retard the complete transfer of liquid and pressure from the receptacle at station VI to station II. During any transfer of hot liquid pressure is retained in both receptacles at stations II and VI. This ensures that food products, cooked in this apparatus, are constantly under pressure from the inception of being immersed in hot liquid throughout the entire cooking period. A slightly higher pressure is maintained at station VI to accelerate liquid transfer between stations VI and II.

Note should be taken here that the air-duct 61 connects with the air-pressure reservoir receiver 102 independent of the air duct 160. The air which feeds the slot 62 via 160 supplies air-pressure for the cooking receptacles at stations III, IV and V. Air outlet duct 66 (FIGS. 5 and 10 and 18) has the pressure regulator whereby pressure fuel into the system by duct 61 is prevented from being dissipated to the extent of emptying the air-pressure receiver 102 and effecting the complete loss of pressure during the cooking process.

The rotatable outer frustum part 46 has three circumferentially spaced apart rows of three axially spaced ports 41', 42' and 43' each, wherewith are connected the hereinbefore-noted tubes 41, 42, and 43 for the respective receptacles C. Also, as shown in FIG. 5, a lower portion of this frustum part integrates a gear, as will be explained in a following section of this specification.

It is important to note here the three series of circles or three circumferentially spaced rows of two axially spaced ports 64' and 67', each, in FIG. 16. These represent the respective inner ends of the three elbows 68 fixed on the exterior of the rotatable outer frustum part 46 of the valve-complex 31. Also, note should be taken here of the circle or seventh, air supply port 54 in this FIG. 17. This is the same circumference as the 43' ports and the slot 62 in the stationary valve part 45. As will be explained in the "operation" section of this specification, this port 54 provides for a charge of fresh air pressured into the receptacle C at the station VI to accelerate the transfer of the hot liquid therefrom to the receptacle C at station II.

Because of the weight of the receptacles C—particularly when loaded with cooking food—and their later-described critical functioning, these two parts 45 and 46 of the valve-complex 31, have to be very carefully formed and machined.

This valve-complex, with its filtering and flushing features is the subject matter of a copending application Ser. No. filed.

Heating of the receptacles C could be effected by gas units, as shown in copending application Ser. No. 750,353 filed August 5, 1968. However, for the instant development a type of heating element 71—presently preferred (FIG. 29)—is shown arranged in pairs in each of the receptacles C (FIG. 3). The terminal ends of each such heating element 71 extends outwardly of the respective receptacles C through insulation knobs (FIG. 20). A pair of wires 76, from a junction box 77 fixed adjacent each receptacle C, provides for a 220 volt single-phase connection to the respective pairs of heating elements 71 for each receptacle C, during its cooking periods. Other wires from each junction box lead to the track-trolley feature 72.

The track-trolley feature 72 comprises a set of conduction bars 78, a, b and c, and pairs of opposed arms 79 each journaling a roller 81. A pair of such arms 79 are hingedly mounted on each receptacle C (FIGS. 20, 27). The mounting of these arms is such as will permit them to straddle the track-bars 78 so as to bring the rollers 81 into contact with the outer track bars a and c, when the respective receptacles C are in the food-cooking positions III, IV and V, as indicated in FIG. 11.

These three conduction bars a, b and c are insulatively attached to an arcuate-shaped plate 82 and protectively recessed in a channel-shaped, insulated hood 83 (FIGS. 21 and 22). The hood 83 is fixed interiorly on the framework B to embrace any two of the receptacles when in the stations III, IV and V (FIG. 3).

The linear dimension and positioning of the track-trolley feature 72—as shown in FIG. 3—is such as will maintain heat for the pair of heating elements 71 in any receptacle C at the stations III, IV and V (See FIG. 11).

Thermal couples 73 have suitable connections 73' to the respective pyrometer 74. These pyrometers are instruments with a visual dial and manually-operable knob whereby to indicate the desired temperature of the hot-liquid in the receptacle C, as registered by the respective thermal couples 73. On the face of each pyrometer 74 is a small light bulb 74' which flashes on and off to indicate the condition of the respective heating element 74.

The motor-mechanism H-1, for effecting the sequential rotation of the receptacle C, is indicated most clearly in perspective in FIG. 18 and diagrammatically in FIG. 19. Such mechanism involves a motor 85 associated with a gear assembly 86 and an indexing component 87. A chain drive 88 to a pinion 89, meshing with a gear 90 on the valve-complex 31, effects the recurring sixty degree advance of the receptacles C through the hereinbefore noted six stations. (FIG. 11) All of these parts are more or less conventional structures. It is their arrangement and functioning that is significant, as determined by the presently-described instrument I.

The motor 85 is a conventional one-third hp which, as shown in FIG. 18, is mounted on the framework B inwardly of the front of the cabinet A. The associated gear assembly 86 is a conventional arrangement such as will effect the requisite controlled advance of the receptacles C recurringly through the six stations as indicated, diagrammatically, in FIG. 11.

The indexing component 87 involves a clutch 91 and a trip-switch device 92. (FIGS. 19 and 23) The relationship of this clutch 91 with the trip-switch 92 is indicated diagrammatically in FIG. 19. At the right of this figure a train of gears is interposed between the gear assembly and the clutch 91 which, through the chain drive 88, effects the drive of the pinion 89 for advancing the receptacles C through the respective stations. The continued rotation of this gear assembly and the chain drive 88 is such that each complete rotation of the clutch 91 effects 60° advance of the receptacles C successively through the six stations, as shown in FIG. 11. The manner wherein this is effected will be set forth in the "operation" section of this specification.

The trip device 92 involves a rocker arm 93, mounting a roller 94, hinged to a housing 96 for activating a conventional microswitch concealed within the housing 96. As shown in FIG. 23 an action pin 97 for such microswitch, extends outwardly of the switch housing in contact with a hub 98 on the arm 93. Such a trip device 92 is arranged on the framework B so that the roller 94 is spring-biased for repeated contact with a trip stub 99 on the lower rim of the clutch 91.

The motor-mechanism H-2, which provides for the requisite air-pressure in the receptacle C, is diagrammed in FIG. 3. This involves a conventional motor-compressor unit 101, air receiver unit 102 and a pressure-control item 103.

The motor-compressor unit 101 (FIG. 3) is a conventional assembly set in a forward part of the cabinet A on the supporting framework B. The air-pressure receiver 102 is set on a rear portion of the framework B, diagonally opposite the motor-compressor unit 101. The pressure-control item 103 is shown directly above the motor of the air-compressor unit 101. A tube 104 connects the two units 101 and 102. Another tube 105 leads from the air-receiver 102 to the fresh-air duct 61 (FIG. 5). Another tube 106 leads to fresh-air duct 160 which feeds slot 62 with constant air pressure. A pressure-relief valve is installed in the tube 106 to vent excess pressure to surge tank 126. This avoids excess pressure build-up during cooking at stations III, IV and V.

The Instruments I, for controlling the functioning of this apparatus are mounted on the panel J and have to do with controlling the successive food-cooking operation in the receptacles C. The arrangements of these instruments is shown in FIGS. 1 and 2.

Figure 2:
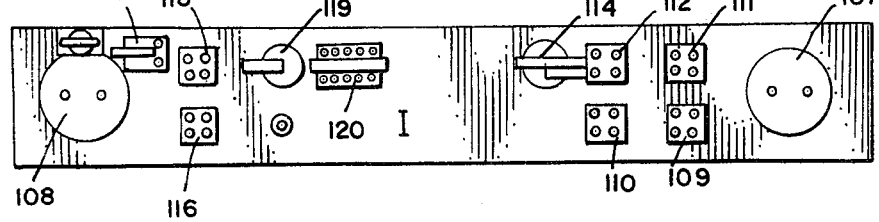
FIG. 2 is a rear view of the instrument panel shown in FIG. 1.

The two major instruments, of this group, are a cooking timer 107 and a hot-liquid transfer timer 108 (See FIG. 2). The respective manual-setting dials 107' and 108' for such timers are shown at opposite ends of the panel J in FIG. 1. From FIG. 2a it will be noted the dial 107' mounts two pointers. On the apparatus, one is black and the other is red. Adjacent the cooking timer 107 is a 220 volt switch 109 and a 110 volt switch 110 with control buttons 109' and 110' shown in FIG. 1. Corresponding signal lights 111 and 112 are positioned directly above these switch buttons 109' and 110'. Juxtaposed to those switches and lights is a rotatable indicator 113 for a cooking pressure-gage 114 shown on the back of this panel J (FIG. 2). Inwardly adjacent the dial 108' is a switch button and a signal light 117'. At the left of that is a fuse 121. The switch button 115 is in circuit with the holding relay 117 (FIG. 2) which factor in an assured, uninterrupted, sequential advance of the receptacles through the six stations, as shown in FIG. 11.

On the back of this panel are these other instruments, a holding relay 117, a safety relay-switch 118, a buzzer 119 and a junction board 120.

It is advantageous to have such a complement and arrangement of the instruments I to ensure not only the automatically-timed cooking periods for the receptacles containing the food but also to ensure against any hazard of an over-timed cooking period for any batch of food. This latter is achieved by the visual and audible signals 117' and 119 to alert an attendant to the need for unloading and loading each successive receptacle C at station I. These will be explained further in the "operation" section of the specification.

The auxiliary units L involve some form of supplemental filters 125, a surge tank 126, a receptacle draining-hose 127 and a receptacle flushing-gadget 128 (FIG. 1).

The supplemental filters 125 (FIG. 28) serve as an accessory to the primary filter 56, to ensure the most complete straining of the hot liquid in the course of the transfer from one receptacle to another, as hereinbefore noted. When used these are removably set in the bottom of each receptacle. Obviously, these supplemental filters may be formed of various materials. This might depend upon the design and dimension of the receptacle wherein they are used. They could be disks of specially-formed, fairly stable porous substance such as generally will maintain its planar form when in use position. The type shown in FIG. 28 comprise upper and lower, fine-mesh fabric disks 131 and 132 with an interposed ring 133 interiorally spanned by a series of spokes 134. Whatever their structure such filters would be dimensioned just enough less than the interior diameter of the receptacles C as to seat in the bottom of a receptacle. They should be such as to easily be inserted into and withdrawn from the receptacles, as occasion may demand.

The surge-tank 126 as shown in FIG. 3 as of rectangular form and attached to the framework B at the lower, rear, right corner thereof. A pipe 136 is shown attached to the rear of the tank 126. This is for connection to a supplemental outlet exteriorly of the area wherein the apparatus normally is in use.

The draining hose 127 is shown in FIG. 27. It is provided for attachment to a drain-pipe 136 secured to the bottom of each of the receptacles C. Such a hose 127 is of a length sufficient to span the distance from the apparatus to a point that will permit the discard of the deteriorated liquid from the receptacle C to a sewage service. One end of such a hose 127 and the drain-pipe 136, have fixed to the respective parts a conventional "quick-connect and release" coupling 137.

The receptacle flushing-gadget 128 (FIG. 1) comprises a section of hose 138 embraced by a coiled spring 139 with a hand-controlled spray nozzle 140 at the other end. In this FIG. 1 the gadget is shown suspended from an overhead source of water supply in such disposition as to make it convenient for occasional use for cleaning the receptacles C from time to time, during and for after the use of the apparatus.

The food-cooking accessories M include food containers 142 and an associated handling tool 143 (FIGS. 29, 30 and 31).

The food-containers 142 are in the nature of trays. As herein shown, they are of comparatively shallow depth and structured from a suitable type of perforate material. When stacks of such traylike containers 142 are inserted into the receptacles C the hot liquid floods all items of food in each tray. Each such tray has a short, integrated central nipple 144 and a plurality of prongs 145 depending from the bottom perimeter. These nipples 144 and prongs 145 are so arranged that when several loaded trays are stacked the prongs 145 on the upper tray engage the inner edge of the rim of the next lower tray with the central nipples 144 axially aligned (FIG. 30).

The handling tool 143 comprises a tube 146 embracing a rod 147 with respective handgrips 148 and 149, and a latch 150.

The hand-grip 148 is fixed to the upper end of a tube 146 and the hand-grip 149 is fixed to the upper end of a rod 147 concealed in the tube 146. The latch 150 is pivoted at 151 in the slotted lower end of the tube 146. A wire 152 connects the inner end of the latch 150 with the rod 147. The hand-grip 148 has an axial bore 153 wherein is housed a spring 154 retained in place by a nut 155 and bearing against a washer 156 fixed to the rod 147. The spring 154 normally biases the rod 147 to dispose the latch 150 radially outwardly at the lower end of the tube 146. However, when the two hand-grips 148 and 149 are grasped, so as to pull them toward each other, the spring 154 is compressed and the latch 150 is retracted into the tube 146. The use of this handling tool, with the food containers 142, will be explained in the operation section of the specification.

The operation of this apparatus requires recognition of the fact that the concept and construction thereof provides for a functioning never heretofore known or attainable in any antecedent disclosure. The functioning permits an uninterrupted, pressurized cooking of successive batches of food in hot, non-aqueous liquid in a plurality of receptacles wherein the hot liquid is injected for cooking food with an almost instant removal of the hot-liquid from each batch of cooked food and the immediate insertion of a fresh batch of food after a receptacle is drained of the hot-liquid and pressure.

Preparation for a continuing use of this apparatus requires recognition that such use may extend over several hours; sometimes for an entire day or night. To initiate that preparation, two receptacles (e.g. $y$ and $z$ FIG. 11) are supplied with the requisite amounts of the non-aqueous liquid. The amount for each receptacle may require a half to three-quarters of its capacity. When placed in these two receptacles the liquid may be at no more than room temperature—possibly less. The supplying of these two receptacles with the liquid should take place with the two receptacles at the respective stations II and V (FIG. 11): The closure-lid 33 for each of these two receptacles then is set in place.

When any of these two receptacles C are at these stations III and V two pairs of rollers 81, of the track-trolley system 72, are in contact with the bars 78a and c to supply a 220 volt to the heating elements 71 (FIGS. 3 and 24).

The button 109' is depressed. The signal light III is illuminated and the 220 volt current is supplied to the track-trolley system 72. The heating of the elements 71 in these two receptacle begins. The pyrometers 74 for all three receptacles C must be set to indicate the required cooking temperature in these two receptacles, and for any two receptacles thereafter at these two stations. Incidently, when any two of the receptacles C has a port 43' of the tube 43 in registration with the peripheral slot 63, in the valve part 45 (See FIG. 5 and 19), air pressure in that one of those two receptacles is supplied and/or maintained therein. Such air pressure is derived from the air-pressure receiver 102 as it is developed and maintained by the air-compressor unit 101 (FIG. 3).

Any time the heating elements 71 are on, in the respective receptacles at stations III, IV and V, the light 74' (FIG. 1) for the respective receptacles will indicate that fact.

These preliminaries having been effected the apparatus is ready for continuous use.

If it has not been done previously, the next operation is the setting of the dials 107' and 108' for the respective cooking-timer 107 and the hot-liquid transfer-timer 108. Obviously, this is effected by positioning the knobs on the dials 107' and 108'.

These timers and all of the other instruments on the panel J—other than the switch 109—M are in a 110v circuit controlled by the activation of the button 110' and 115. However, there is a predetermined sequence that is imperative for the functioning of these instruments in the continuing operation of the apparatus, as will appear in what follows.

The liquid in the two receptacles, at stations III and V, being at the requisite temperature the next of these preparatory actions is the loading of the receptacle at station I. When this is done, and the closure-lid has been sealed in place, the button 110' and 115 are depressed. The lights 112 and 117' indicate that this 110v circuit has been closed to all the instruments involved for the continuous use of the apparatus.

The button 110', once so depressed, remains depressed during any continued use of the apparatus. The button 115, however, requires depressing, preferably, following each loading of a receptacle at station I. If this is not done, at that time, the buzzer 119 (FIG. 2) will sound to alert an attendant to such negligence. When there is this depression of the button 115, following the loading of any receptacle and the closure-lid 33 is set in position to seal the receptacle C at station I, the three receptacles, then, are advanced automatically one station each, in accordance with the pre-set time sequences controlled by the timers 107 and 108.

It is at this point that a hereinbefore-noted phenomenon of this invention takes place—viz: the recurring transfer of the hot-liquid from one receptacle to another at these stations. The nature of that transfer will become evident most readily by reference to FIG. 11. For example, the rotative part 46, of the valve complex (FIG. 5) being activated, advances receptacle $z$ to station VI and receptacle $x$ to station II. This brings the port 41', for the tube 41, and the port 43', for the tube 43 from the receptacle $z$, into registration with the respective channels 57 and 54 in the stationary part 45 of the valve-complex 31. Concurrently, the port 42' for the tube 42 and the port 43' for the tube 43 of the receptacle $x$ are brought into registration with the respective channels 58 and 64 in the stationary valve part 45. This establishes three concurrent conditions in this valve-complex as this hot-liquid transfer between these two receptacles is effected. The hot liquid from the receptacle $z$ drains from the tube 41 to the channel 57 which passes through the filter 56 and out through the channel 58 into the tube 42 for injection into the food-loaded receptacle $x$. Concurrently, fresh air from the duct 61 passes through the axial channel 60 via the radial port 54 into the tube 43 to the receptacle $z$; the fresh-air flow accelerates the flow of the hot-liquid through the filter 56 enroute to the receptacle $x$.

Here, then, two other phenomena of this invention are effected. One, is the injection of hot-liquid into the closure-sealed, food-loaded receptacle (e.g. receptacle $x$ at station II). The other is the filtering of the hot-liquid incident to each hot-liquid transfer.

Although the receptacle $z$ is emptied of hot liquid there still is pressure therein as the receptacle $z$ moves from station VI to station I.

In its approach to station I, the port 43' for the just-drained receptacle $z$, comes into registration with the radial channel 59. Thereupon, all remaining pressure is vented from the receptacle $z$ through the axial channel 59 and into the lower extension 53 of the chamber 51. Such pressure passes through the bottom of the filter 56 and out through the chamber 51 into the channel 67 for discharge into the elbow 68, via port 67'. This vents the pressure through the port 64' at the bottom of the elbow 68 and out through the eighth, air vent port or channel 64 into the stationary valve part 45 and through the deteriorate air duct or backwash exhaust port 68' to the surge tank 126 (FIG. 3).

Such venting of this air flow through the filter 51 constitutes another of the phenomena of this apparatus; namely, the cleansing of the filter element 56 following the cooking of food in each of the receptacles.

In the instant embodiment the axial channel 59 is below the filter compartment 51 and its extension 53. At the time of the afore-mentioned hot-liquid transfer, channel 59 is filled with hot liquid, incident to the passing thereof from channel 57 down through chamber 51 and out through the filter 56 into the lower extension 53. Upon the next 60 degree rotation of the receptacles a tube 43 comes into registration with channel 59. Thereupon all remaining pressure in the receptacle, at station I, is vented through channel 59. This forces the hot liquid in the channel 59 up through the filter 56 and out through an elbow 68 and out through the duct 68' for discharge into the surge tank 126. As noted above, air pressure per se could be used to achieve this cleansing result.

The receptacle z now practically drained of hot-liquid, and any remnant of air pressure, is set at station I as the receptacle x and y become set at station III and V, respectively. The closure lid 33 for the receptacle z at station I is removed. loaded with food and the closure-lid reset within a few seconds. Meanwhile, the first-loaded receptacle x begins its food-cooking function at station III.

Figure 2A:
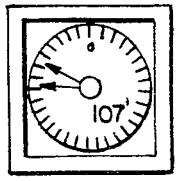
FIG. 2a is a much-enlarged view of the instrument shown at the left end of the instrument panel.

Note should be taken here of the earlier observation that there are two pointers associated with the cooking timer 107 (FIG. 2a). One is black, the other is red. When the knob for this cooking timer 107 is turned across the dial both pointers are set at the then-desired cooking period for each receptacle, successively at the two stations III and V. At the instant a food-loaded receptacle C moves into station III—and all the facilities are functioning—the red pointer initiates its move out from its set position toward zero on the dial. Upon reaching zero, the red pointer snaps back into registration with the black pointer. At that instant, providing that the switch 115 has been depressed, the holding switch 117 activates the clutch drive assembly to rotate the receptacles 60° bringing the receptacles into stations II and VI respectively. At this station the transfer timer 108 takes control of the apparatus and retains the receptacles at stations II and VI until the red pointer on timer 108 reaches zero. The hot liquid transfer is completed and at the instant the red pointer of timer 108 reaches zero it snaps back to the pre-set black pointer. This activates the switch 117 to cause the clutch drive mechanism to advance the receptacles another 60° bringing the receptacles into stations I, III and V respectively. The timer 107, thereupon, resumes control of the apparatus in its continuous successive operation.

The button 110', when depressed, provides current for all the instruments functioning with a 110v current, (FIG. 2). This excepts only the trolley-track system 72.

The motor 85, for the mechanism H-1, is in constant operation with its functioning controlled by the "on-and-off" position of the clutch 91, as effected by the correlative functioning of the cooking timer 107 and the liquid-transfer timer 108.

As has been noted, in the antecedent portions of this "operation" section, the receptacles C move sequentially through recurring 60° (FIG. 11). Such movement is controlled by the action of the clutch 91 and the switch-trip device 92 (FIG. 23), as permitted by the aforesaid action of the timers 107 and 108. Each depression of the button 115, preferably, immediately following the closure-lid sealing of the food-loaded receptacle C at station I, awaits the zeroing-out of the cooking-timer 107. When it occurs the result is a releasing of the holding switch 117. Thereupon, the circuit to the switch-trip device 92 reactivates the microswitch in the housing 96. This shifts the arm 93 to set the roller 94 in contact with the rim of the clutch 91 (FIG. 23). Under the action of the motor 85 the clutch 91 makes another revolution subject to the stub 99 contacting the roller 94. The arm 93 is retracted to cause the microswitch, in the housing 96, to cut off current and release the holding switch 117.

Upon the next movement of the red pointer, on the transfer timer 107, in the zero position, the microswitch in the housing 96 is reactivated to re-position the roller 93 against the rim of the clutch 91. The cooking-timer 107 is reactivated, causing the red pointer to move outward towards zero. At that instant the group of receptacles advance another 60°.

The total cooking time for each loaded receptacle is determined by the time the receptacles are at stations III and V, plus any incidental time a receptacle is at station IV during the hot-liquid transfer between the receptacles at stations VI and II. For example, if the cooking timer 107 is set for 3 minutes and the transfer-timer 108 is set for 1 minute, the total cooking time for any food-loaded receptacle is seven minutes.

Periodically, these time periods will be influenced by the kind, quantity and quality of the food that is to be subjected to cooking.

FIG. 11 presents exemplary cooking periods of 180 sec., 30 sec., and 180 sec. for each receptacle C between each hot-liquid transfer. Therefore, the cooking timer might be set for three minutes of recurring cooking periods in each receptacle with the timer set at ½ minute.

As each receptacle moves into station I all remaining pressure is vented from it. Thereupon the attendant may instantly retract the closure-lid and remove the cooked food. He then may immediately load a batch of raw food into the empty receptacle and seal the closure-lid. The attendant then must depress button 115 which causes light 117 to be illuminated indicating that the apparatus is ready to automatically rotate another 60° at the instant the red pointer on cooking timer 107 reaches zero. If the attendant fails to depress 115 the apparatus will not rotate at that instant but a buzzer will sound to warn the attendant that the apparatus is ready to rotate and he must depress the button 115 to allow it to do so. This prevents the apparatus from moving into transfer stations II and VII, if an attendant has perhaps forgotten to unload, reload and seal the receptacle at station I.

The cooking of food in these receptacles is made expeditious and efficient by the use of the accessories illustrated in FIGS. 29, 30 and 31. It is believed their use is quite obvious from these several views and the explanation thereof in the foregoing part of this specification.

Note should be taken here that, when occasions may require, the apparatus may be used for cooking food in only one receptacle or in two receptacles. This is capable of being effected by the appropriate actuation of the instruments I, as explained above.

At the close of use of this apparatus—or at interims when long-extended operations are required—cleansing of the receptacles can be effected by use of either or both of the "flushing gadget" 128 and/or the "quick-connect" parts 137 (FIGS. 1 and 27) respectively. At any time when this is being done, the supplemental filters 125 (FIG. 28) could be removed and cleansed.

In the use of the valve-complex 31, as shown in FIG. 32, the outer part 46 is stationary and the inner part 45 is rotated. However, the sequences and results in effecting the cooking are substantially the same as above set forth.

Variations and modifications in the details of structure and arrangement of the parts may be resorted to within the spirit and coverage of the appended claims.

We claim:

1. A rotary valve means to simultaneously control flow of a plurality of diverse fluids to and from conduit means for said diverse fluids, comprising a pair of sealingly interengaged, relatively rotatable, inner and outer valving members each having a plurality of inlet ports and a plurality of outlet ports therein, fluid passage means interiorly of said inner valving member interconnecting said inlet ports with said outlet ports in said inner valving members, different selected inlet and outlet ports in the outer valving member registering with different selected inlet and outlet ports in the inner valving member in different relative rotative positions between the inner and outer valving members to enable flow of fluid from some of said conduit means to other of said conduit means, including means to effect simultaneous control of flow of a plurality of diverse fluids through said conduit means and valve means in some of the different relative rotative positions of the valving members, and to preclude flow of at least one of the diverse fluids in other selected relative rotative positions of the valving members.

2. A rotary valve means as in claim 1, wherein said inner valving member has a frusto-conically shaped outer surface and a plurality of axially and circumferentially spaced apart inlet and outlet ports therein and fluid passage means interiorly thereof interconnecting respective pairs of said inlet and outlet ports, said outer valving member rotatably supported on the inner valving member and having a frusto-conically shaped inner surface matingly engaged on the outer surface of the inner valving member, said outer valving member having a plurality of axially and circumferentially spaced apart inlet and outlet ports therein registerable with selected inlet and outlet ports in the inner valving member in different relative rotational positions of the inner and outer valving members, and a plurality of conduit means connected to the inlet and outlet ports in the outer valving member.

3. A rotary valve means as in claim 2, wherein said fluid passage means in said inner valving member includes a filter chamber at one end of the inner valving member and a separate, vent chamber at the other end of the valving member, some of said inlet and outlet ports communicating with said filter chamber and some communicating with said vent chamber, and filter means in said filter chamber to filter flow of fluid from one of said inlet ports to one of said outlet ports communicating with said filter chamber.

4. A rotary valve means as in claim 3, wherein a circumferentially extending fluid flow channel is in the outer surface of said inner valving member arranged to simultaneously interconnect two of the outlet ports in the outer valving member with one of the inlet ports in the inner valving member.

5. A rotary valve means as in claim 4, wherein a first axially extending fluid passage is in the inner valve member connecting the circumferential flow channel with said one inlet port therein.

6. A rotary valve means as in claim 5, wherein a second axially extending flow passage is in said inner valving member in circumferentially spaced relation to the first axial passage interconnecting another of said inlet ports therein with another of said outlet ports therein.

7. A rotary valve means as in claim 6, wherein a pair of fluid supply conduits are connected to said inner valving member in fluid flow communicating relationship with the inlet ports connected to said axially extending fluid flow passages, and a pair of exhaust conduits are connected to a pair of spaced apart outlet ports in said vent chamber.

8. A rotary valve means as in claim 1, wherein the inner valving member has a substantially frusto-conically shaped outer surface and the outer valving member has a substantially frusto-conically shaped inner surface matingly engaged with the outer surface of the inner valving member said inner valving member having a filter chamber at an upper end thereof and a separate, vent chamber at a lower end thereof, a filter in the filter chamber, said inner valving member has a first, liquid drain port therein adjacent the upper end of the filter chamber on the inlet side of the filter and a second, liquid supply port therein adjacent the lower end of the filter chamber on the outlet side of the filter, said outer valving member has a first plurality of circumferentially spaced ports therein in the same plane as the first port in the inner valving member and each adapted to be in registry, successively, with said first port in different selected rotative positions between the inner and outer valving members, and a second plurality of circumferentially spaced ports in said outer valving member in substantially the same plane as the second port in the inner valving member and each adapted to be in registry, successively, with said second port in different relative rotative positions between the inner and outer valving members, so that upon relative rotation between the inner and outer valving members, flow occurs, successively, from each of the first plurality of ports in the outer valving member, through the first port, filter, and second port in the inner valving member, and then through the second plurality of ports, successively, in the outer valving members.

9. A rotary valve means as in claim 8, wherein a plurality of circumferentially spaced air supply ports are in the inner valving member in axially spaced relation to the second port therein, and a third plurality of circumferentially spaced ports are in the outer valving member in the same plane as the air supply ports and adapted to be successively in registry with the air supply ports upon relative rotation between the inner and outer valving members.

10. A rotary valve means as in claim 9, wherein an air vent port is in the inner valving member in communication with the vent chamber and in the same plane as the air supply ports and in circumferentially spaced relation thereto, and said third plurality of circumferentially spaced ports in the outer valving member are adapted to be in registry with said vent port upon relative rotation between the inner and outer valving members.

11. A rotary valve means as in claim 10, wherein said first, second and third plurality of ports in the outer valving member are in flow communicating relationship with at least one cooking receptacle to control flow of liquid and air pressure to and from the receptacle upon relative rotation between the inner and outer valving members.

12. A rotary valve means as in claim 11, wherein there are three vertically disposed, open-topped cooking receptacles each connected with a respective, different port in each of said first, second and third plurality of ports, and said ports in said valving members effect control of fluid to and from said cooking receptacles and transfer of fluid between selected pairs of said cooking receptacles in different relative rotative positions between the inner and outer valving members.

* * * * *